US010569808B2

(12) United States Patent
Niggemann et al.

(10) Patent No.: US 10,569,808 B2
(45) Date of Patent: Feb. 25, 2020

(54) MOTOR VEHICLE REINFORCED STRUCTURAL ELEMENT SYSTEM

(71) Applicant: SIKA TECHNOLOGY AG, Baar (CH)

(72) Inventors: Stephan Niggemann, Widen (CH); Stefan Ulmann, Zufikon (CH); Fabian Moser, Sarmensdorf (CH); Marcel Meister, Hochfelden (CH); Michael Meier, Niederrohrdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/023,290

(22) Filed: Jun. 29, 2018

(65) Prior Publication Data
US 2019/0002029 A1    Jan. 3, 2019

(30) Foreign Application Priority Data

Jun. 29, 2017    (EP) .................................... 17178832

(51) Int. Cl.
*B62D 25/04* (2006.01)
*B62D 29/00* (2006.01)
(Continued)

(52) U.S. Cl.
CPC ............... *B62D 25/04* (2013.01); *B32B 7/12* (2013.01); *B62D 25/02* (2013.01); *B62D 29/001* (2013.01);
(Continued)

(58) Field of Classification Search
CPC ........ B62D 25/04; B62D 25/02; B62D 25/06; B62D 29/005
(Continued)

(56) References Cited

U.S. PATENT DOCUMENTS 6,467,834 B1    10/2002  Barz et al.
8,641,131 B2 *  2/2014   Honda ................. B62D 25/025
                                                296/187.12
(Continued)

FOREIGN PATENT DOCUMENTS

EP    1 930 231 A1    6/2008
EP    2 154 052 A1    2/2010
(Continued)

OTHER PUBLICATIONS

Jan. 17, 2018 Search Report issued in German Patent Application No. 17178832.6.
(Continued)

*Primary Examiner* — Dennis H Pedder
(74) *Attorney, Agent, or Firm* — Oliff PLC

(57) ABSTRACT

A system of a reinforced structural element of motor vehicle include: structural element includes a first and second sheet, wherein the sheets are connected to one another at first and second joining points, wherein the sheets form elongate cavity in region between the joining points, and wherein second sheet has, in region between first and second joining points, a bulge with first leg arranged at first joining point and with second leg arranged at second joining point; a reinforcing element includes a first and second side walls connecting the wall arranged in cavity of structural element; and adhesive bonding reinforcing element to structural element; wherein first side wall of reinforcing element arranging the first joining point and second side wall of reinforcing element arranging the second leg of second sheet so larger portions of force acting on first joining point of reinforcing element transferring, to second leg of second sheet.

17 Claims, 5 Drawing Sheets

(51) Int. Cl.
  *B62D 25/02*  (2006.01)
  *B32B 7/12*  (2006.01)
  *B62D 29/04*  (2006.01)
  *B60R 13/08*  (2006.01)

(52) U.S. Cl.
  CPC ......... *B62D 29/005* (2013.01); *B62D 29/008* (2013.01); *B62D 29/048* (2013.01); *B32B 2605/00* (2013.01); *B60R 13/0815* (2013.01)

(58) Field of Classification Search
  USPC .............................................. 296/193.06, 210
  See application file for complete search history.

(56) References Cited

U.S. PATENT DOCUMENTS

| | | | |
|---|---|---|---|
| 10,232,886 B2 * | 3/2019 | Boettcher | B62D 25/025 |
| 2008/0296164 A1 * | 12/2008 | Dajek | B62D 29/002 205/80 |
| 2011/0206890 A1 * | 8/2011 | Belpaire | B62D 29/002 428/68 |
| 2016/0229457 A1 | 8/2016 | Boettcher | |

FOREIGN PATENT DOCUMENTS

| | | |
|---|---|---|
| GB | 2 375 328 A | 11/2002 |
| WO | 2008/077944 A1 | 7/2008 |
| WO | 2011/117398 A1 | 9/2011 |
| WO | 2011/117402 A1 | 9/2011 |
| WO | 2014/124924 A1 | 8/2014 |

OTHER PUBLICATIONS

Nov. 15, 2019 Office Action issued in European Patent Application No. 17178832.6.

\* cited by examiner

MOTOR VEHICLE REINFORCED STRUCTURAL ELEMENT SYSTEM

The invention relates to a system of a reinforced structural element of a motor vehicle. In particular, the invention relates to a system comprising a structural element, a reinforcing element and an adhesive.

In many cases, components, such as bodies and/or frames of means of transport, in particular of motor vehicles, have structures with cavities in order to permit lightweight constructions. In that context, it is often desirable to substantially strengthen these cavities and thus the component while retaining the low weight.

For this reason, use is made in particular in automotive engineering, but also in aeronautical and marine engineering, of reinforcing elements (also "reinforcers") for reinforcing cavities.

FIG. 1 shows, schematically, a body of a motor vehicle. In that context, the body 10 has various structures with cavities, such as the A-pillar 11, the B-pillar 12, the C-pillar 13 and the roof frame 14.

These and other cavities or structures in bodies of motor vehicles are usually reinforced with reinforcing elements which have a foamable adhesive for bonding the reinforcing element in the structural component. The drawback of such known solutions is that the reinforcing effect that can be achieved with such known solutions is not sufficient for regions with particularly high requirements with respect to a reinforced structure, such as the A-pillar or the roof frame. In particular for components which perform important functions in the event of very high loading, such as are experienced in accidents, the greatest possible mechanical reinforcing effect is desirable.

This invention therefore has the object of providing an improved system for reinforcing structures in motor vehicles which on one hand still permits lightweight constructions and on the other hand satisfies very high demands in respect of mechanical reinforcement of the structural element.

This object is achieved with a system of a reinforced structural element of a motor vehicle, wherein the system comprises: a structural element which comprises a first sheet and a second sheet, wherein the sheets are connected to one another at a first joining point and at a second joining point, and wherein the sheets form an elongate cavity in the region between the first joining point and the second joining point, and wherein the second sheet has, in the region between the first joining point and the second joining point, a bulge with a first leg arranged at the first joining point and with a second leg arranged at the second joining point; a reinforcing element which comprises a first side wall, a second side wall and a connecting wall connecting the side walls, and which is arranged in the cavity of the structural element; and adhesive which bonds the reinforcing element to the structural element; wherein the first side wall of the reinforcing element is arranged in the region of the first joining point and the second side wall of the reinforcing element is arranged in the region of the second leg of the second sheet so that the larger portion of a force acting on the first joining point in the direction of the reinforcing element is transferred, by the reinforcing element, to the second leg of the second sheet.

This solution has the advantage that it is thus possible to achieve markedly improved mechanical reinforcing properties than was the case with conventional reinforcing solutions. In particular for structural elements such as A-pillars or roof frames, there is the risk that, when loaded in an accident, the pillar or the frame will bend outwards (the profile is deflected outwards), so that the first joining point is pressed in the direction of the cavity. This causes a force to act on the first joining point in the direction of the cavity of the structural element, or in the direction of the reinforcing element arranged therein. It is therefore advantageous if this force acting on the joining point is distributed in the structural element so that the structural element as a whole can withstand much greater loads.

A core concept of the present invention is that, in the event of loading, the reinforcing element reacts the load at the correct location (in this case at the first joining point) and distributes the load more widely in the structural element (in this case onto the second leg of the second sheet). Proceeding from this basic principle, it is possible to produce a reinforcing element which is more compact and therefore optimized in terms of weight, and which provides the desired mechanical properties without, in so doing, markedly increasing the weight of the component.

In one exemplary embodiment, the structural element is part of an A-pillar or of a roof frame of a body of a motor vehicle.

This has the advantage that, in the event of loading such as occurs in accidents, particularly relevant structures of the body can be efficiently reinforced.

In one exemplary embodiment, the reinforcing element is constructed at least in part of plastic, fibre-reinforced plastic, aluminium or magnesium.

This has the advantage of making it possible to create lightweight reinforcing elements which satisfy the mechanical requirements for this application.

In one exemplary embodiment, the reinforcing element is constructed at least in part of glass fibre-reinforced plastic or of carbon fibre-reinforced plastic. In that context, it is for example possible to use endless fibres, short fibres or long fibres.

In one exemplary embodiment, the reinforcing element is constructed at least in part of polyamide, in particular of PA6 or of PA6.6.

In one exemplary embodiment, the first side wall and the second side wall of the reinforcing element extend on the same side of the connecting wall, or the first side wall and the second side wall of the reinforcing element extend on different sides of the connecting wall.

In the event of loading, the connecting wall of the reinforcing element transmits the force from the first side wall to the second side wall, and thus from the first joining point to the second leg of the second sheet. In that context, the reinforcing element can have an essentially C-shaped or U-shaped cross section so that the first and second side wall extend on the same side of the connecting wall, or the reinforcing element can have an essentially Z-shaped or S-shaped cross section so that the first and second side wall extend on different sides of the connecting wall. A suitable variant of this can be chosen depending on the geometry of the cavity, and depending on the demands of the loading event.

In one exemplary embodiment, a wall thickness of the first side wall is greater than a wall thickness of the second side wall.

This exemplary embodiment is based on the knowledge that, in the event of loading, the first side wall experiences a greater load than the second side wall. Thus, reinforcing the first side wall in a targeted manner makes it possible to reinforce the entire system without, in so doing, unnecessarily increasing the weight.

In one exemplary embodiment, a wall thickness of the first side wall is between 2 and 8 mm, preferably between 3 and 5 mm, and a wall thickness of the second side wall is between 1 and 4 mm, preferably between 2 and 3 mm.

In one exemplary embodiment, the reinforcing element comprises ribs which are oriented essentially orthogonal to a longitudinal axis of the reinforcing element, and which connect the first side wall and the second side wall to one another.

"Essentially orthogonal to the longitudinal axis" means, in this context, that the ribs can also be arranged with slight deviations orthogonal to the longitudinal axis, since for example the side walls of the reinforcing element do not necessarily run exactly parallel to one another over an entire length, and therefore the ribs are not in every case arranged exactly orthogonal to the longitudinal axis.

In one exemplary embodiment, a distance between adjacent ribs, measured along the longitudinal axis of the reinforcing element, is between 5 and 50 mm, preferably between 8 and 40 mm, particularly preferably between 10 and 30 mm.

The provision of ribs inside the reinforcing element has the advantage of making it possible to further improve a force transfer from the first side wall to the second side wall.

In one exemplary embodiment, the reinforcing element has a length, measured in the direction of the longitudinal axis of the reinforcing element, of 200 to 1200 mm, preferably of 300 to 1100 mm, particularly preferably of 500 to 800 mm.

In one exemplary embodiment, the first side wall and/or the second side wall has a breadth, in each case measured transversely to the longitudinal axis of the reinforcing element, of between 10 and 50 mm, preferably between 10 and 40 mm, particularly preferably between 10 and 30 mm.

Designing the reinforcing element with the above-mentioned dimensions has the advantage of making it possible to reinforce, in an ideal manner, in particular A-pillars or roof frames. Tests have shown that a breadth of the first and second side walls of approximately 18 mm is sufficient to ensure the transfer, described here, of the force from the first joining point to the second leg of the second sheet. This means that it is not necessary to use a larger reinforcing element and thus a greater weight.

In one exemplary embodiment, the adhesive has a layer thickness of 0.3 to 7 mm, preferably of 0.5 to 5 mm, particularly preferably of 1 to 3 mm.

Tests have shown that too great a layer thickness of the adhesive has negative consequences for the mechanical reinforcing properties of the system. It is therefore advantageous to provide the adhesive in the layer thickness indicated here.

In one exemplary embodiment, the adhesive is a non-expandable adhesive or an adhesive having an expansion rate of less than 400%, preferably of less than 300%, particularly preferably of less than 250%.

In the context of this invention, the expression "non-expandable" refers to a behaviour of a material in which the volume of the material does not change by more than 10%. Thus, materials such as adhesives which for example expand or contract slightly on curing are understood to be non-expandable materials.

In the context of this invention, the "expansion rate" is understood to be the increase in volume, relative to the original volume, that takes place during expansion. Thus, an expansion rate of 100% implies a doubling of the volume during expansion.

The choice of a non-expandable or a low-expandable adhesive has the advantage that the mechanical properties are not excessively diminished by the adhesive layer.

In one exemplary embodiment, the adhesive is a tape adhesive, a shape memory adhesive, an injectable adhesive, an injection-moulded adhesive or an extruded adhesive.

This has the advantage that the reinforcing element proposed here can be combined with different adhesive systems.

In one exemplary refinement, the adhesive is a tape adhesive. In that context, an adhesive tape is bonded to the first and second side faces of the reinforcing element, and then the reinforcing element is introduced into the cavity. Alternatively, it is also possible for the adhesive tape to be first applied to the structural element, and then the reinforcing element can be pressed onto the adhesive tape.

A tape adhesive of this kind has the advantage of simplifying handling of the adhesive application. In particular, metering of the volume of adhesive is easily guaranteed when using tape adhesives.

In one alternative refinement, the adhesive is a shape memory adhesive. Shape-memory adhesives, as described for example in documents WO2011/117398 and WO2011/117402, can for example be applied to the reinforcing element and then forced into a stressed shape. In this stressed shape, the reinforcing element with the adhesive is introduced into the cavity. The adhesive can be returned to its original shape by application of heat, and thus the adhesive closes a gap between the reinforcing element and the structural element.

The advantage of such shape-memory adhesives is that it produces a gap between the reinforcing element and the structural element, in order for example to coat the structural element, and that at the same time it is possible to achieve an adhesive bond with very good mechanical properties because it is not necessary to foam the shape-memory adhesive.

In another alternative refinement, the adhesive is an injectable adhesive. A system with injectable adhesives is presented for example in document WO2008/077944. In that context, the reinforcing element is first arranged in the structural element, and then the liquid adhesive is introduced into the interspace between the reinforcing element and the structural element.

This has the advantage of making it possible to achieve very good mechanical properties of the adhesive layer, once again because it is not necessary to foam the adhesive.

In another exemplary refinement, the adhesive is an injection-moulded adhesive. In particular, the adhesive has an expansion rate of less than 400%, preferably of less than 300%, particularly preferably of less than 250%.

The advantage of conventional injection-molded adhesives of this kind is that it makes it possible to obtain a component with very simple handling. Usually, the reinforcing element with the adhesive that is injection-molded thereon is introduced into the cavity, then the structural element is coated, and then the adhesive is expanded in order to bond the reinforcing element to the structural element.

In another alternative refinement, the adhesive is an extruded adhesive. A system with an extruded adhesive of this kind is described for example in WO2014/124924.

An advantage of extruded adhesives is in particular that it is not necessary to overcome a gap between the reinforcing element in the structural element, and that consequently no foaming, with the associated mechanical weakening, of the adhesive is necessary.

As extruded adhesive, it is for example possible to use adhesives that are available under the trade name Sika-Power®.

As injection-moulded adhesives, it is for example possible to use adhesives that are available under the trade name SikaReinforcer®.

As injectable adhesives, it is for example possible to use adhesives that are available under the trade name SikaPower®.

In one exemplary embodiment, a cross section of the reinforcing element constitutes less than 70%, preferably less than 60% and particularly preferably less than 50%, of a cross section of the structural element, measured at the same point.

The advantage of a reinforcing element having a small cross section is that it makes it possible to obtain a component that is optimized in terms of weight. In addition, open regions in the cavity allow for better circulation of a liquid for dip coating of the body.

In one exemplary embodiment, an outer cavity, which is free from the reinforcing element and adhesive, constitutes at least 25%, preferably at least 30% and particularly preferably at least 35%, of a cross section of the structural element, measured at the same point.

The advantage of a free outer cavity of this kind is that it leaves free a region of the cavity at which little additional mechanical reinforcement can be obtained. Thus, the weight of the component, in particular of the reinforcing element, is used in regions of the cavity in which the load distribution from the first joining point to the second leg of the second sheet can be used particularly efficiently.

In one exemplary embodiment, the connecting wall of the reinforcing element is at least partially free from adhesive and/or the adhesive on the first side wall is not connected to the adhesive on the second side wall.

The arrangement of the adhesive on the first side wall and on the second side wall and at least partially not on the connecting wall has the advantage that the adhesive can be used in a targeted manner at those locations at which a connection between the reinforcing element of the structural element provides an effective contribution to the mechanical properties of the component. The provision of two separate adhesive regions has the advantage that application of the adhesive is simplified, in particular in the case of tape adhesives and extruded adhesives.

In one exemplary embodiment, a first adhesive is arranged at the first side wall and a second adhesive is arranged at the second side wall.

In one exemplary refinement, the first adhesive and the second adhesive are identical adhesives.

In one alternative refinement, the first adhesive and the second adhesive are different adhesives. For example, the first adhesive can have an expansion rate or a composition different to that of the second adhesive.

In one exemplary embodiment, a sealing or noise-attenuating material is arranged on the connecting wall and/or on the front wall and/or on the rear wall of the reinforcing element.

In one exemplary refinement, this sealing or noise-attenuating material has an expansion rate of greater than 500%, preferably greater than 1000% and particularly preferably greater than 1500%.

The application of sealing or noise-attenuating material at the stated locations has the advantage that the structural element, with an element arranged therein, can simultaneously be reinforced and sealed.

As sealing or noise-attenuating material, it is for example possible to use an expandable material available under the trade name SikaBaffle® 450.

Details and advantages of the invention are described in the following text on the basis of exemplary embodiments and with reference to schematic drawings, in which.

Figure 1:
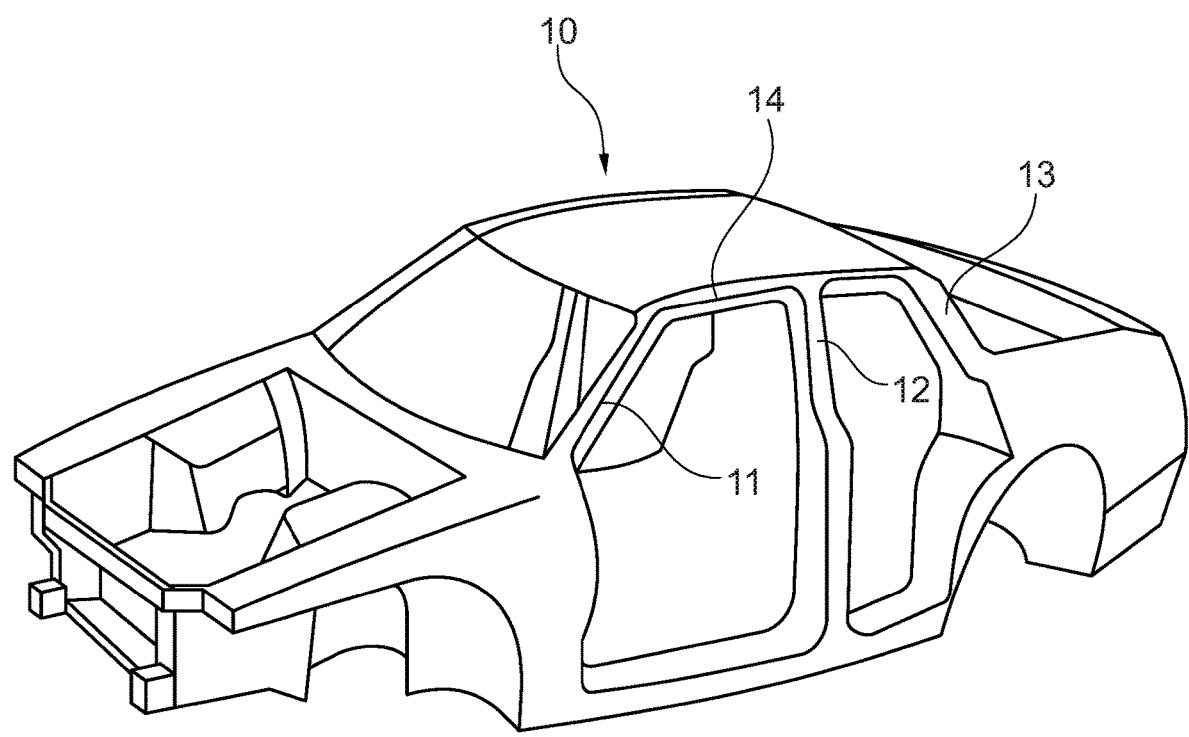
FIG. 1 shows an exemplary illustration of a body of a motor vehicle.
Figure 2A:
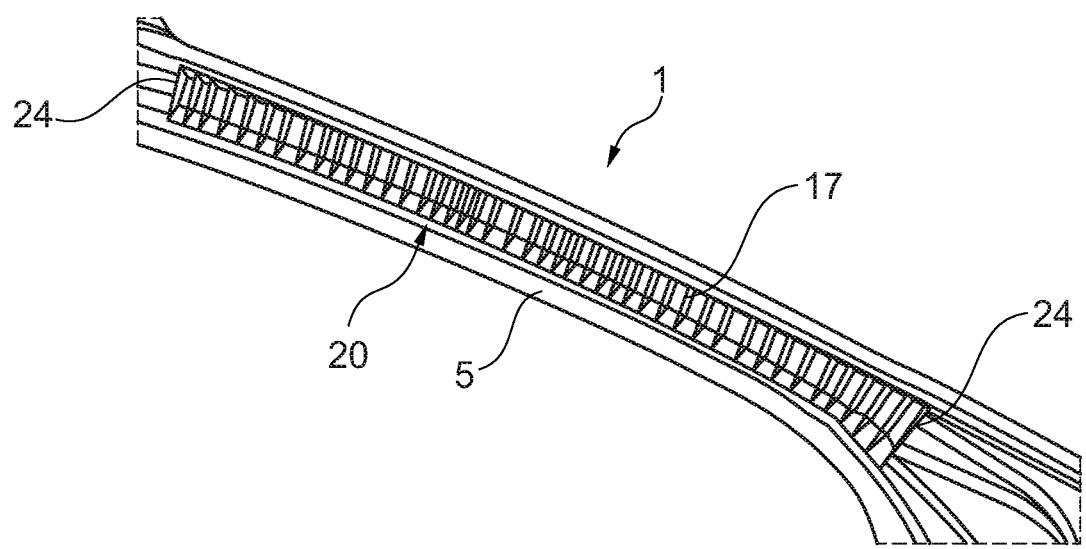
FIG. 2a shows an exemplary illustration of a reinforcing element in a structural element.

FIG. 2a shows an exemplary system 1 of a reinforced structural element of a motor vehicle, wherein this illustration shows only the second sheet 5 of the structural element. This illustration omits the first sheet in order to show the reinforcing element 20. The elongate reinforcing element 20 is arranged in the elongate cavity of the structural element. The reinforcing element 20 has a front and rear wall 24. The reinforcing element 20 also has ribs 17 that are oriented essentially orthogonal to the longitudinal axis of the reinforcing element and also connect the first side wall 21 to the second side wall 22. This example shows clearly that, in regions of the reinforcing element 20 in which the side walls do not run parallel to one another, the ribs 17 can deviate slightly in their arrangement relative to the longitudinal axis, as is the case here in a region of a lower end of the reinforcing element 20.

Figure 2B:
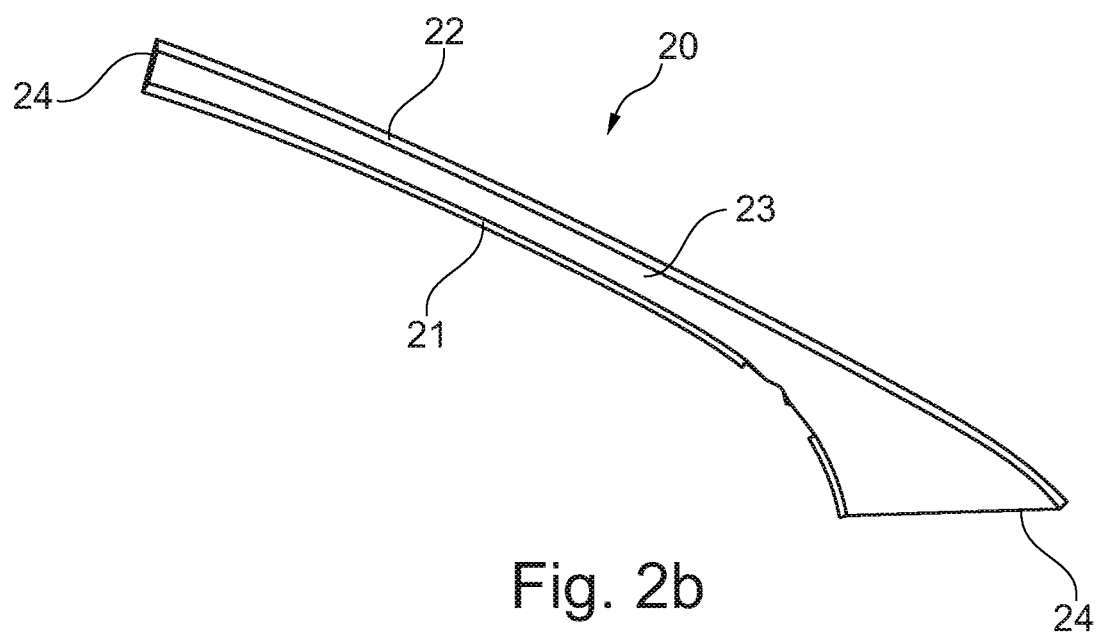
FIG. 2b shows an exemplary illustration of a reinforcing element.

FIG. 2b shows an exemplary reinforcing element 20 with no structural element. The reinforcing element 20 has a first side wall 21 and a second side wall 22, and a connecting wall 23 that connects the side walls. In this exemplary embodiment, the reinforcing element 20 still has a front and rear wall 24. Ribs are not shown in this depiction, since they are covered by the connecting wall 23.

Figure 3A:
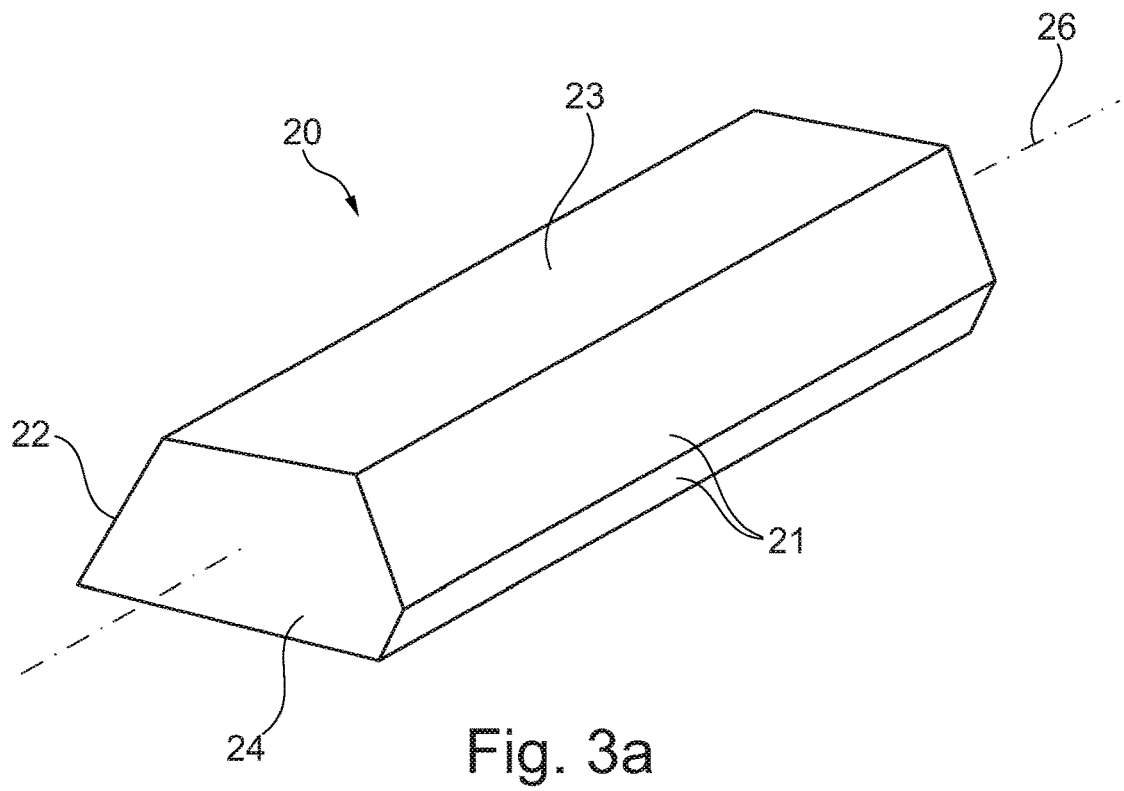
FIGS. 3a and 3b show an exemplary illustration of a reinforcing element.
Figure 3B:
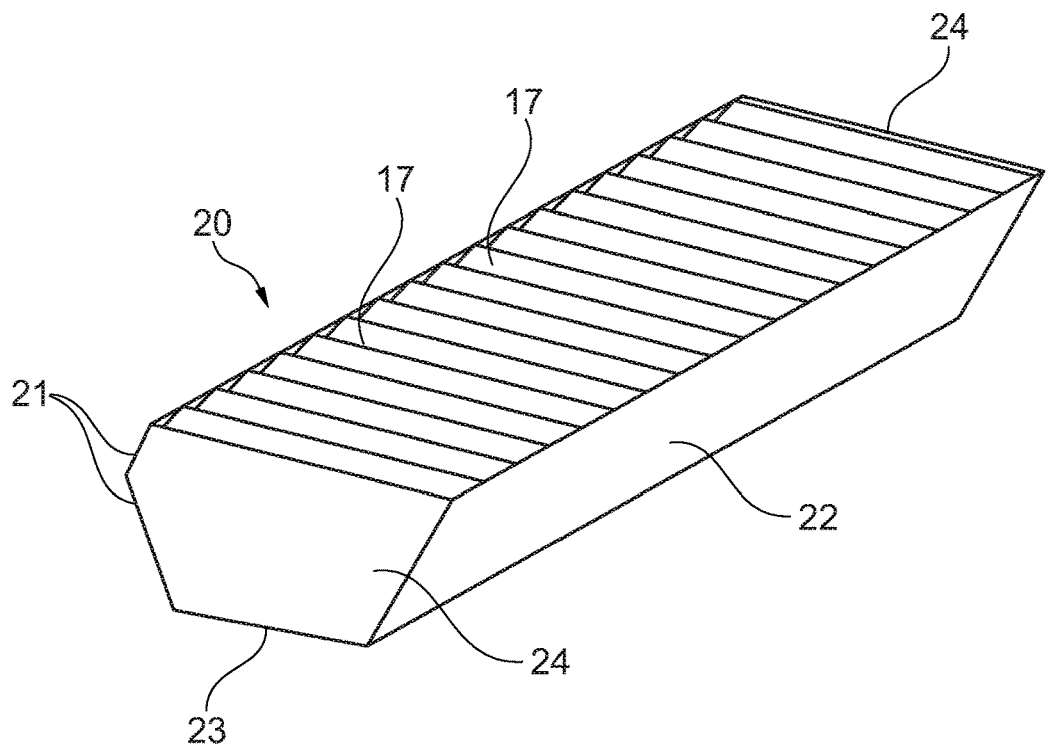

FIGS. 3a and 3b illustrate another exemplary schematic reinforcing element 20. In that context, in FIG. 3a the connecting wall 23 of the reinforcing element 20 is oriented upwards, and in FIG. 3b the connecting wall 23 of the reinforcing element 20 is oriented downwards. The reinforcing element 20 has a longitudinal axis 26 and a first side wall 21 and a second side wall 22. In this exemplary embodiment, the first side wall 21 has a bend so that the first side wall 21 is not in one plane.

The reinforcing element 20 also has a front and rear wall 24 and ribs 17. Once again, the ribs 17 are arranged essentially orthogonal to the longitudinal axis 26 of the reinforcing element 20.

Figure 4:
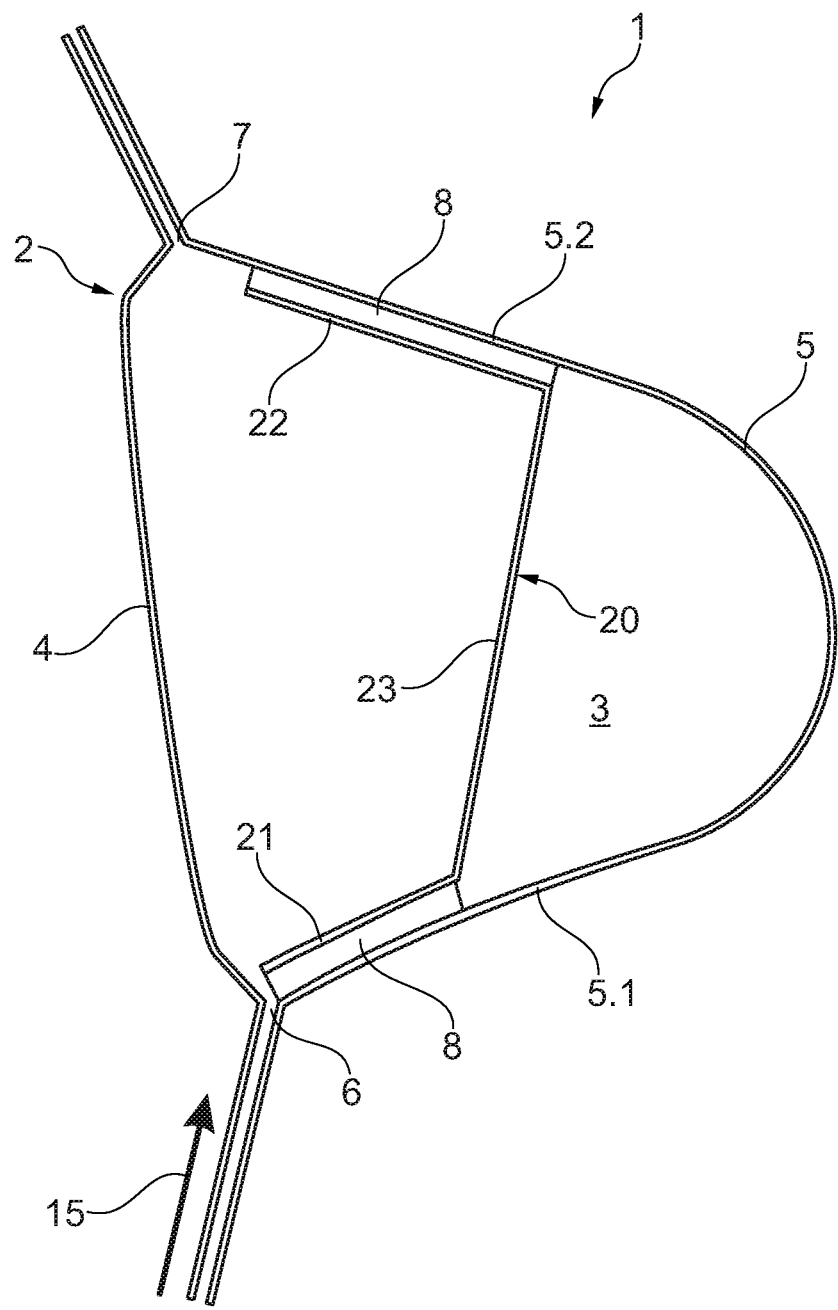
FIG. 4 shows an exemplary illustration of a cross section through a system of a reinforced structural element.

FIG. 4 shows an exemplary cross section through a system 1 of a reinforced structural element 2. In that context, the structural element 2 comprises a first sheet 4 and a second sheet 5. The first sheet 4 and the second sheet 5 are connected to one another at a first joining point 6 and at a second joining point 7. Between the first joining point 6 and the second joining point 7, the first sheet 4 and the second sheet 5 form a cavity 3. In that context, the second sheet 5 has a bulge, wherein a first leg 5.1 is arranged at the first joining point 6 and a second leg 5.2 is arranged at the second joining point 7.

The reinforcing element 20 is now arranged in the cavity 3 of this structural element 2. Once again, the reinforcing element 20 has a connecting wall 23 and a first side wall 21 and a second side wall 22. In that context, the first side wall 21 is arranged in the region of the first joining point 6 and the second side wall 22 is arranged in the region of the second leg 5.2 of the second sheet 5. The first side wall 21 and the second side wall 22 are in each case bonded to the structural element 2 using adhesive 8. In that context, in particular the first side wall 21 can be bonded only to the second sheet 5, or to the first sheet 4 and to the second sheet 5. In this exemplary embodiment, the first side wall 21 is arranged in the region of the first joining point 6, and in that context bonded only to the second sheet 5.

A force 15, acting on the first joining point 6 in the direction of the cavity 3 or of the reinforcing element 20, is now, for the greater part, transferred by the reinforcing element 20 to the second leg 5.2 of the second sheet 5.

Figure 5A:
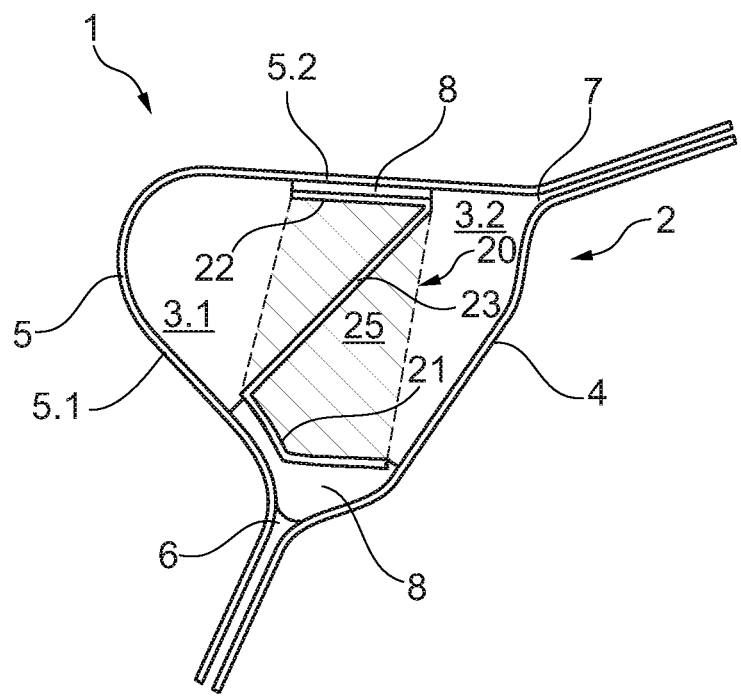
FIGS. 5a and 5b show an exemplary illustration of a cross section through a system of a reinforced structural element.
Figure 5B:
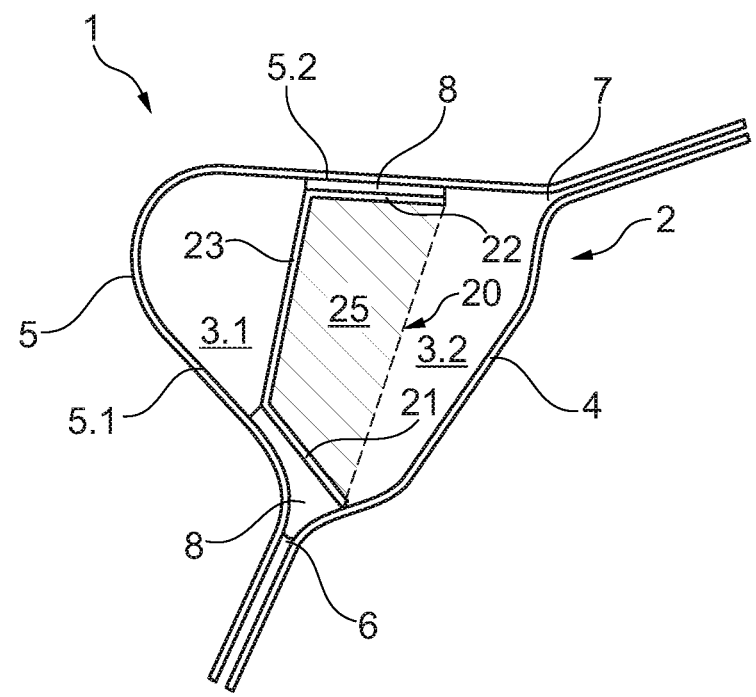

FIGS. 5a and 5b show two alternative cross sections through a system 1 of a reinforced structural element 2. In the exemplary embodiment shown in FIG. 5a, the reinforcing element 20 has an essentially Z-shaped or S-shaped cross section, and in the exemplary embodiment shown in FIG. 5b, the reinforcing element 20 has an essentially C-shaped or U-shaped cross section.

In both exemplary embodiments, the cavity 3 of the structural element 2 has an outer cavity 3.1 and an inner cavity 3.2 which are respectively free from the reinforcing element 20 and from the adhesive 8, or are free from the cross section 25 of the reinforcing element 20. These free cavities, in particular the outer cavity 3.1, make it easier for a coating liquid to circulate during dip coating of the body. Furthermore, reducing the cross-sectional area 25 of the reinforcing element 20 permits a more lightweight component.

In the exemplary embodiments of FIGS. 5a and 5b, the first side wall 21 is arranged in the region of the first joining point 6, and in that context is bonded both to the first sheet 4 and to the second sheet 5.

LIST OF REFERENCE SIGNS

1 System
2 Structural element
3 Cavity
3.1 Outer cavity
3.2 Inner cavity
4 First sheet
5 Second sheet
5.1 First leg
5.2 Second leg
6 First joining point
7 Second joining point
8 Adhesive
10 Body
11 A-pillar
12 B-pillar
13 C-pillar
14 Roof frame
15 Force on the first joining point in the direction of the reinforcing element
17 Ribs
20 Reinforcing element
21 First side wall
22 Second side wall
23 Connecting wall
24 Front/rear wall
25 Cross-sectional area of the reinforcing element
26 Longitudinal axis of the reinforcing element

The invention claimed is:

1. A system of a reinforced structural element of a motor vehicle, the system comprising:
a structural element which comprises a first sheet and a second sheet, wherein the sheets are connected to one another at a first joining point and at a second joining point, and wherein the sheets form an elongate cavity in the region between the first joining point and the second joining point, and wherein the second sheet has, in the region between the first joining point and the second joining point, a bulge with a first leg arranged at the first joining point and with a second leg arranged at the second joining point;
a reinforcing element having an essentially C-shaped cross-section comprising a first side wall, a second side wall and a connecting wall connecting the side walls, and which is arranged in the cavity of the structural element; and
adhesive which bonds the reinforcing element to the structural element;
wherein the first side wall of the reinforcing element is arranged in the region of the first joining point and the second side wall of the reinforcing element is arranged in the region of the second leg of the second sheet so that the larger portion of a force acting on the first joining point in the direction of the reinforcing element is transferred, by the reinforcing element, to the second leg of the second sheet.

2. The system according to claim 1, wherein the structural element is part of an A-pillar or of a roof frame of a body of a motor vehicle.

3. The system according to claim 1, wherein the reinforcing element is constructed at least in part of fibre-reinforced plastic or of plastic or of aluminium or of magnesium.

4. The system according to claim 1, wherein the first side wall and the second sidewall of the reinforcing element extend on the same side of the connecting wall, or wherein the first side wall and the second side wall of the reinforcing element extend on different sides of the connecting wall.

5. The system according to claim 1, wherein a breadth of the first side wall and/or of the second side wall, measured transversely to a longitudinal axis of the reinforcing element, is between 10 and 35 mm.

6. The system according to claim 1, wherein the reinforcing element comprises ribs which are oriented essentially orthogonal to a longitudinal axis of the reinforcing element, and which connect the first side wall and the second side wall to one another.

7. The system according to claim 1, wherein the reinforcing element has a length, measured in the direction of the longitudinal axis of the reinforcing element, of 200 to 1200 mm.

8. The system according to claim 1, wherein the adhesive has a layer thickness of 0.3 to 7 mm.

9. The system according to claim 1, wherein the adhesive is a non-expandable adhesive or an adhesive having an expansion rate of less than 400%.

10. The system according to claim 1, wherein the adhesive is a tape adhesive, a shape memory adhesive, an injectable adhesive, an injection-moulded adhesive or an extruded adhesive.

11. The system according to claim 1, wherein a cross section of the reinforcing element constitutes less than 70% of a cross section of the structural element, measured at the same point.

12. The system according to claim 1, wherein an outer cavity, which is free from reinforcing element and adhesive, constitutes at least 25% of a cross section of the structural element, measured at the same point.

13. The system according to claim 1, wherein the connecting wall of the reinforcing element is at least partially free from adhesive and/or wherein the adhesive on the first side wall is not connected to the adhesive on the second side wall.

14. The system according to claim 1, wherein a sealing or noise-attenuating material is arranged on the connecting wall and/or on the front wall and/or on the rear wall.

15. The system according to claim 1, wherein the reinforcing element is arranged in the cavity of the structural element so that the first side wall extends from connecting wall toward the first joining point and the second side wall extends from the connecting wall toward the second joining point.

16. The system according to claim 1, wherein an end of the first side wall is located respectively closer to the first joining point than an end of the second side wall to the second joining point.

17. The system according to claim 1, wherein the second side wall is bonded only to the second sheet with the adhesive.

* * * * *